No. 893,191. PATENTED JULY 14, 1908.
F. O. NORTON.
RIDING ATTACHMENT FOR WALKING PLOWS.
APPLICATION FILED AUG. 31, 1907.
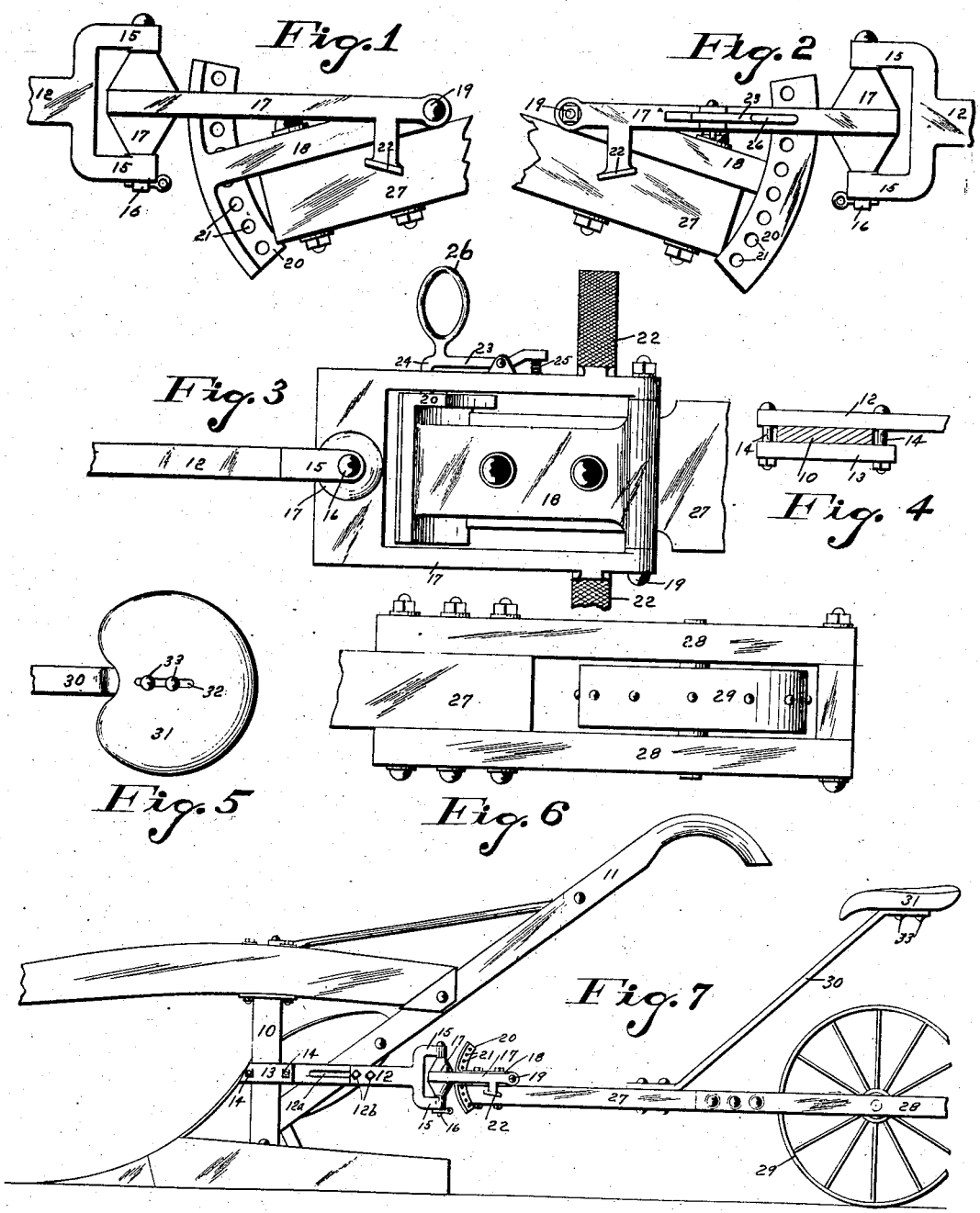

UNITED STATES PATENT OFFICE.

FRED O. NORTON, OF PILOT MOUND, IOWA.

RIDING ATTACHMENT FOR WALKING-PLOWS.

No. 893,191.      Specification of Letters Patent.      Patented July 14, 1908.

Application filed August 31, 1907. Serial No. 390,889.

*To all whom it may concern:*

Be it known that I, FRED O. NORTON, a citizen of the United States, residing at Pilot Mound, in the county of Boone and State of Iowa, have invented a certain new and useful Riding Attachment for Walking-Plows, of which the following is a specification.

The object of my invention is to provide a riding attachment for walking plows in which the weight of the rider is supported on the wheel which travels in the furrow being made, so that it will travel upon a smooth surface.

A further object is to provide a device of this kind in which the operator may by tilting backwardly or forwardly in the seat and at the same time pulling up or pushing down on the plow handle, readily and easily control the depth to which the plow will enter the ground.

A further object in this connection is to provide means for locking the device in any desired position so that, after the plow is once set to enter the ground to the desired amount, it will remain in such position and the operator will not need to exert his strength in holding it at the point desired.

My invention consists in the construction, arrangement and combination of the various parts of the device whereby the objects contemplated are attained, as hereinafter more fully set forth, pointed out in my claims and illustrated in the accompanying drawings, in which—

Figure 1 shows a detail side view illustrating the joint in the beam that connects the riding attachment with the plow standard. Fig. 2 shows a similar view of the other side of the same. Fig. 3 shows a top or plan view of the same. Fig. 4 shows an enlarged detail view illustrating the means for connecting the riding attachment with the plow standard. Fig. 5 shows a detail view of the seat and its support to illustrate the means for adjusting the seat. Fig. 6 shows a detail plan view of the supporting wheel and frame thereof, and Fig. 7 shows a side elevation of the complete device, embodying my invention, attached to a walking plow.

Referring to the accompanying drawings, it will be seen that the plow is of the ordinary type of walking plow. This plow of itself forms no part of my present invention.

The numeral 10 indicates the plow standard and 11 the plow handles.

My improved attachment comprises an arm 12 having at its forward end a cleat 13 provided with hooks 14, by which it may be secured to the plow standard 10 as shown in Fig. 4. At the rear of the arm 12 is a forked extension 15 having a bolt 16 extending vertically through it. This arm 12 is formed of two parts slidingly connected with each other by means of the slot $12^a$, and the bolts $12^b$, so that its length may be adjusted to suit the requirements of use. I have found that plow handles vary in length and in height, and by adjusting this arm 12, the operator may ride in proper position relative to the handles, for effective and convenient use. Mounted on this bolt between the forks is a frame 17 arranged to move in a horizontal plane on the bolt 16. Contained within this frame 17 is a plate 18 pivoted at its rear end to the frame 17 by means of the bolt 19, the body of the plate 18 being extended forwardly. At the forward end thereof is a segmental arm 20 provided with perforations 21. Formed on the side of the frame 17 near its rear end are the foot rests 22 and pivoted to one side of the frame 17 is a lever 23 having at its forward end a pin 24 passed through the frame and designed to enter the openings 21. At the rear of the lever 23 is a spring 25 for normally holding the pin in one of the openings 21. Formed on the outer portion of the forward end of the lever 23 is a loop 26 designed to receive the toe of the operator when his foot is resting upon the support 22. Fixed to the plate 18 is a beam 27 extending rearwardly and having bolted to its rear end the wheel supporting frame 28, in which the wheel 29 is rotatably mounted. Near the rear of the beam 27 is a seat support 30 having at its top a seat 31 with its central portion slightly in the rear of the supporting wheel 29. This seat is provided with a slot 32 through which the rivets 33 are passed and extended through the seat support 30, so that the operator may slide the seat forwardly and rearwardly to a limited extent. The parts of the device are so arranged and proportioned that the operator seated upon the seat 30 may have his feet resting in the foot rests 22 and may have his hands resting upon the plow handles in an easy and convenient position.

In practical use the device may be quickly and easily attached to any plow or similar device by simply connecting the forward end of the arm 12 with the plow standard, assuming that the parts are assembled as shown in Fig. 7. It is obvious that the operator may ride in a comfortable and easy position and at the same time readily control the plow as required to raise or lower its point, by simply sliding the seat forwardly or rearwardly as desired or by tilting the seat forwardly or rearwardly and at the same time pulling up or pushing down on the handles. It would require considerable exertion on the part of the operator to hold the plow in any position other than the one it would normally assume for any great length of time and I have therefor provided the latch device so that the operator may, by moving the lever 23 outwardly, first set the plow in the desired position and then by releasing the said lever 23 the spring will automatically force the lever into one of the holes 21 and thus lock the device in the desired position. This locking device is of great advantage when turning around at the end of the field for the plow point may be set so that the plow will ride on top of the ground and then the operator may turn around at the end of the furrow without getting out of the seat and when in position for starting a new furrow he may release the locking device and cause the plow point to enter the ground until it reaches the desired depth, he may then set the locking device so that the plow will continue to run at the same level. In this way the plow runs much steadier than it would without the riding attachment. At any time the operator notices that the plow runs too deep or too shallow the fault may be remedied very easily by releasing the lever 23 as before described and adjusting the plow to the desired position.

Having thus described my invention, what I claim and desire to secure by Letters Patent of the United States therefor, is—

1. The combination with a plow having rearwardly projecting handles, of a frame connected at its forward end to the plow and extended rearwardly, a supporting wheel at the rear end of the frame, said frame having a joint therein to permit up and down movement of the frame at the joint and also having a joint therein to permit lateral movement, a seat on the frame above the wheel, said seat and handles being so arranged relative to each other that an operator on the seat may by grasping the handles cause the frame to tilt to any desired position at the joint which permits vertical movement, and a latch device capable of being operated by foot power for locking the joint in any position of adjustment in which it may be placed.

2. In a device of the class described, the combination of an arm designed to be detachably connected to a plow, means for adjusting the length of said arm, a frame pivoted to the rear of the arm to swing in a horizontal plane, a plate pivoted to the rear of said frame and extending forwardly within the frame, a segmental bar fixed to the said plate and provided with a row of openings, a spring actuated lever having a toe loop thereon and extending through the frame, designed to enter any of said openings, foot rest on the sides of the frame, a beam fixed to the plate, a wheel supporting frame fixed to the rear of the beam, a single wheel mounted in said frame, a seat support fixed to the beam and extending upwardly and rearwardly over the wheel and a seat slidingly mounted on said seat support.

FRED O. NORTON.

Witnesses:
J. ADAMSON,
JOHN HERN.